US012497278B2

(12) United States Patent
Kim et al.

(10) Patent No.: US 12,497,278 B2
(45) Date of Patent: Dec. 16, 2025

(54) CAP AUTOMATIC FASTENING APPARATUS AND CAP AUTOMATIC FASTENING METHOD

(71) Applicant: SEMES CO., LTD., Cheonan-si (KR)

(72) Inventors: Yoon Whoi Kim, Suwon-si (KR); Ji Keun Song, Suwon-si (KR)

(73) Assignee: Semes Co., Ltd., Chungcheongnam-do (KR)

(*) Notice: Subject to any disclaimer, the term of this patent is extended or adjusted under 35 U.S.C. 154(b) by 5 days.

(21) Appl. No.: 18/394,780

(22) Filed: Dec. 22, 2023

(65) Prior Publication Data

US 2024/0208787 A1 Jun. 27, 2024

(30) Foreign Application Priority Data

Dec. 27, 2022 (KR) ........................ 10-2022-0185168

(51) Int. Cl.

*B67B 3/20* (2006.01)
*B67B 3/26* (2006.01)
*F17C 13/06* (2006.01)

(52) U.S. Cl.

CPC ............ *B67B 3/208* (2013.01); *B67B 3/2066* (2013.01); *B67B 3/261* (2013.01); *F17C 13/06* (2013.01)

(58) Field of Classification Search

CPC ....... F17C 13/06; B67B 3/2066; B67B 3/208; B67B 3/261; B67B 3/26

See application file for complete search history.

(56) References Cited

U.S. PATENT DOCUMENTS

| | | | | | |
|---|---|---|---|---|---|
| 4,614,077 | A * | 9/1986 | Muto | B67B 3/208 | 53/317 |
| 4,616,466 | A * | 10/1986 | Tanaka | B67B 3/2093 | 53/317 |
| 5,088,685 | A * | 2/1992 | Salvucci, Sr. | F17C 13/085 | 220/582 |
| 5,321,935 | A * | 6/1994 | Spatz | B67B 3/208 | 53/53 |
| 6,654,117 | B1 * | 11/2003 | Reading | B67B 3/264 | 356/240.1 |
| 6,874,301 | B2 * | 4/2005 | Kitamoto | B67B 3/26 | 53/484 |

(Continued)

FOREIGN PATENT DOCUMENTS

| | | | | |
|---|---|---|---|---|
| JP | 2014037272 A * | 2/2014 | B67B 3/26 |
| KR | 102112763 B1 * | 6/2020 | F17C 13/04 |

(Continued)

OTHER PUBLICATIONS

Korean Office Action dated Jun. 24, 2024 issued in corresponding Korean Patent Application No. 10-2022-0185168.

*Primary Examiner* — Andrew M Tecco

(74) *Attorney, Agent, or Firm* — Harness, Dickey & Pierce, P.L.C.

(57) ABSTRACT

Disclosed is a method of fastening a cap of a container, the method including: specifying a screw thread engagement point of a cap and a neck ring of a container; and aligning the engagement point with a fastening start position of the cap and fastening the cap to the neck ring, in which the specifying of the engagement point includes detecting the engagement point by rotating the cap in a reverse direction in a state where the cap is seated on the neck ring.

12 Claims, 8 Drawing Sheets

(56) References Cited

U.S. PATENT DOCUMENTS

| | | | | |
|---|---|---|---|---|
| 7,024,837 | B2 * | 4/2006 | Takebe | B67B 3/26 53/317 |
| 12,024,414 | B2 * | 7/2024 | Strauss | B67B 3/261 |
| 2021/0087037 | A1 * | 3/2021 | Strauss | B67B 3/2093 |
| 2023/0113494 | A1 * | 4/2023 | Degliesposti | B21D 51/46 72/370.1 |

FOREIGN PATENT DOCUMENTS

| | | | |
|---|---|---|---|
| KR | 102345571 | B1 | 12/2021 |
| KR | 10-2022-0105703 | A | 7/2022 |

* cited by examiner

CAP AUTOMATIC FASTENING APPARATUS AND CAP AUTOMATIC FASTENING METHOD

CROSS-REFERENCE TO RELATED APPLICATIONS

This application claims priority to and the benefit of Korean Patent Application No. 10-2022-0185168 filed in the Korean Intellectual Property Office on Dec. 27, 2022 the entire contents of which are incorporated herein by reference.

TECHNICAL FIELD

The present invention related to a cap automatic fastening apparatus and a cap automatic fastening method.

BACKGROUND ART

In general, the process of manufacturing semiconductors, display panels, and the like requires the supply of various gas depending on the application, and most of the gas is relatively toxic and flammable, which may cause safety accidents and environmental pollution when they are inhaled by the human body or exposed to the atmosphere.

The gases used in these semiconductor manufacturing processes are very important to manage, and the gas is stored and transported in gas containers (hereinafter referred to as "gas cylinders") filled with high pressure and is connected to connectors including gas flow paths extending to the outside to supply gas to a manufacturing line. When the gas is exhausted, the gas cylinder is replaced by an operator to ensure that any residual debris inside the gas cylinder is not fed into the manufacturing line.

Gas cylinders are normally protected by a protective cap to prevent damage to the cylinder valve and leakage of the contents, and gas cylinders that are exhausted are reused, so the process of fastening and disconnecting the protective cap is repeated, resulting in variety in wear of the fastening part (screw thread) and mounting angles and sizes of the fastening parts, thereby having difficulties in applying general automated bolting fastening technology.

SUMMARY OF THE INVENTION

The present invention has been made in an effort to provide a cap automatic fastening apparatus and a cap automatic fastening method capable of increasing the success rate of a process of automatically fastening a protective cap.

The present invention has also been made in an effort to provide a cap automatic fastening apparatus and a cap automatic fastening method capable of preventing a jamming phenomenon in a process of fastening a protective cap to a neck ring of a gas cylinder.

The object of the present invention is not limited thereto, and other objects not mentioned will be clearly understood by those of ordinary skill in the art from the following description.

An exemplary embodiment of the present invention provides a method of fastening a cap of a container, the method including: (a) specifying a screw thread engagement point of a cap and a neck ring of a container; and (b) aligning the engagement point with a fastening start position of the cap and fastening the cap to the neck ring, in which the specifying of the engagement point includes detecting the engagement point by rotating the cap in a reverse direction in a state where the cap is seated on the neck ring.

Further, the engagement point may be a point at which a waveform of a torque changes rapidly when the cap is rotated in the reverse direction.

Further, the point at which the waveform of the torque changes rapidly may be a point at which the torque is rapidly resolved.

Further, the specifying of the engagement point may include stopping the reverse rotation immediately when the point at which the waveform of the torque changes rapidly is detected.

Further, the specifying of the engagement point may include determining periodicity of the points and specifying the engagement point.

Further, the fastening of the cap to the neck ring may include determining a time when the torque is rapidly increased after rotation of the cap as a final fastening point.

Further, the fastening of the cap to the neck ring may include, when the fastening of the cap fails, retrying from the specifying of the engagement point.

Further, when the retry exceeds a predetermined number of times, the cap may be removed from the neck ring, a tilt of the neck ring may be re-measured, and the cap may be seated on the neck ring based on the re-measured tilt to specify the engagement point.

Further, in the specifying of the engagement point, when the engagement point is not detected, the cap may be reversely rotated by more than one rotation and less than two rotations and then the cap may be fastened to the neck ring.

Another exemplary embodiment of the present invention provides an apparatus for automatically fastening a cap of a container, the apparatus including: a container gripper for fixing a container; an articulated robot for gripping the cap and seating the cap on a neck ring of the container; a cap gripper for fixing the cap seated on the neck ring; a nut runner for fastening the cap to the neck ring; and a control unit for detecting a screw thread engagement point of the cap and the neck ring to control the nut runner so that the cap is ideally fastened to the neck ring.

Further, the control unit may specify a point at which a waveform of a torque detected by a torque detecting unit of the nut runner rapidly is resolved by rotating the cap in a reverse direction as the engagement point.

Further, the control unit may stop the reverse rotation of the cap at the point at which the waveform of the torque is rapidly resolved.

Further, the control unit may determine periodicity of the points at which the waveform of the torque is rapidly resolved by rotating the cap in the reverse direction at least two times to specify the engagement point.

Further, the control unit may control the nut runner to align the engagement point with a fastening start position of the cap and fasten the cap to the neck ring.

Further, the apparatus may further include a tilt inspector for inspecting a tilt of the neck ring.

Further, the container may include a gas cylinder.

Still another exemplary embodiment of the present invention provides a method of fastening a cap of a gas cylinder, the method including: seating a cap on a neck ring of a gas cylinder; rotating the cap in a reverse direction to specify a screw thread engagement point of the cap and the neck ring; and aligning the engagement point with a fastening start position of the cap and fastening the cap to the neck ring, in which the fastening of the cap to the neck ring includes determining a time when a fastening torque is rapidly increased after rotation of the cap as a final fastening point, and the specifying of the engagement point includes, setting a point at which the fastening torque is rapidly resolved when the cap is rotated in a reverse direction as the engagement point, and stopping the reverse rotation immediately when the point at which the fastening torque is rapidly resolved is detected.

Further, the fastening of the cap to the neck ring may include, when the fastening of the cap fails, retrying from the specifying of the engagement point.

Further, when the retry exceeds a predetermined number of times, the cap may be removed from the neck ring, a tilt of the neck ring may be re-measured, and the cap may be seated on the neck ring based on the re-measured tilt to specify the engagement point.

Further, in the specifying of the engagement point, when the engagement point is not detected, the cap may be reversely rotated by more than one rotation and less than two rotations and then the cap may be fastened to the neck ring.

According to the exemplary embodiments of the present invention, when the cap is fastened to the neck ring, the cap and the neck ring are perfectly aligned to prevent incorrect fastening of the cap.

According to the exemplary embodiments of the present invention, the cap is securely fastened.

According to the exemplary embodiments of the present invention, the error rate of the cap fastening is low, which makes the operation much faster and quicker.

According to the exemplary embodiments of the present invention, an automated cap fastening technique is possible.

The effect of the present invention is not limited to the foregoing effects, and non-mentioned effects will be clearly understood by those skilled in the art from the present specification and the accompanying drawings.

DETAILED DESCRIPTION

Figure 1:
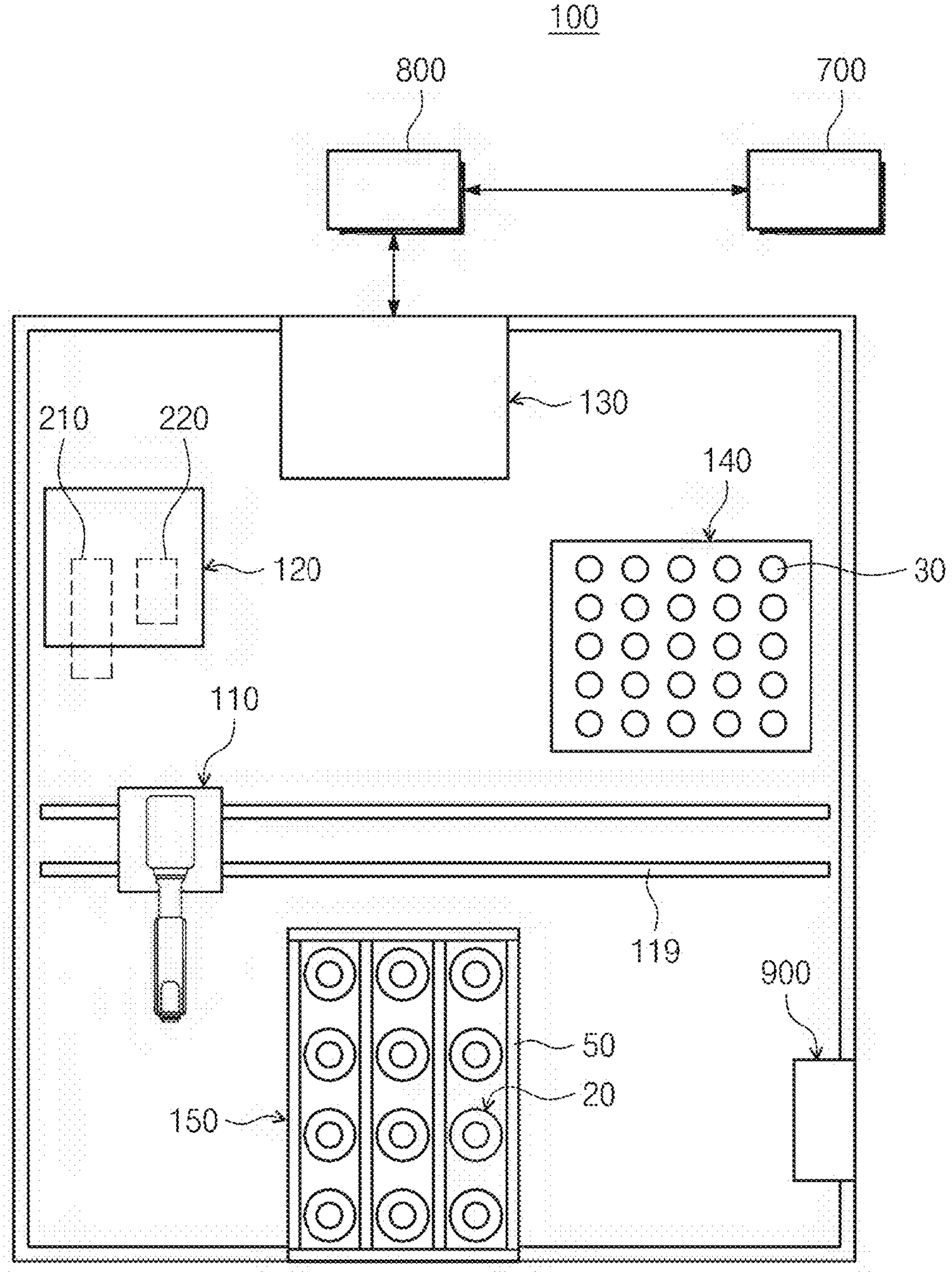
FIG. 1 is a diagram illustrating a gas cylinder transportation and inspection system including a cap fastening apparatus according to an exemplary embodiment of the present invention.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the term "same" or "identical" is used in the description of example embodiments, it should be understood that some imprecisions may exist. Thus, when one element or value is referred to as being the same as another element or value, it should be understood that the element or value is the same as the other element or value within a manufacturing or operational tolerance range (e.g., ±10%).

When the terms "about" or "substantially" are used in connection with a numerical value, it should be understood that the associated numerical value includes a manufacturing or operational tolerance (e.g., ±10%) around the stated numerical value. Moreover, when the words "generally" and "substantially" are used in connection with a geometric shape, it should be understood that the precision of the geometric shape is not required but that latitude for the shape is within the scope of the disclosure.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
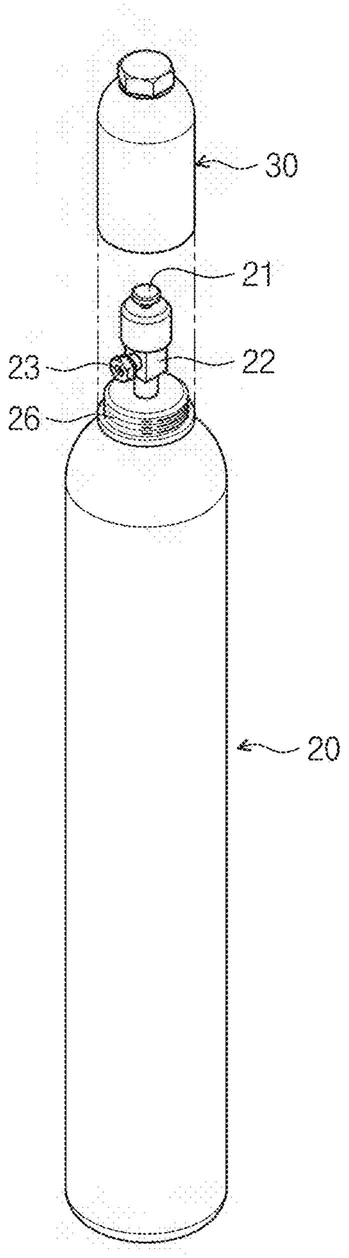
FIG. 2 is a diagram illustrating a gas cylinder illustrated in FIG. 1.
Figure 3:
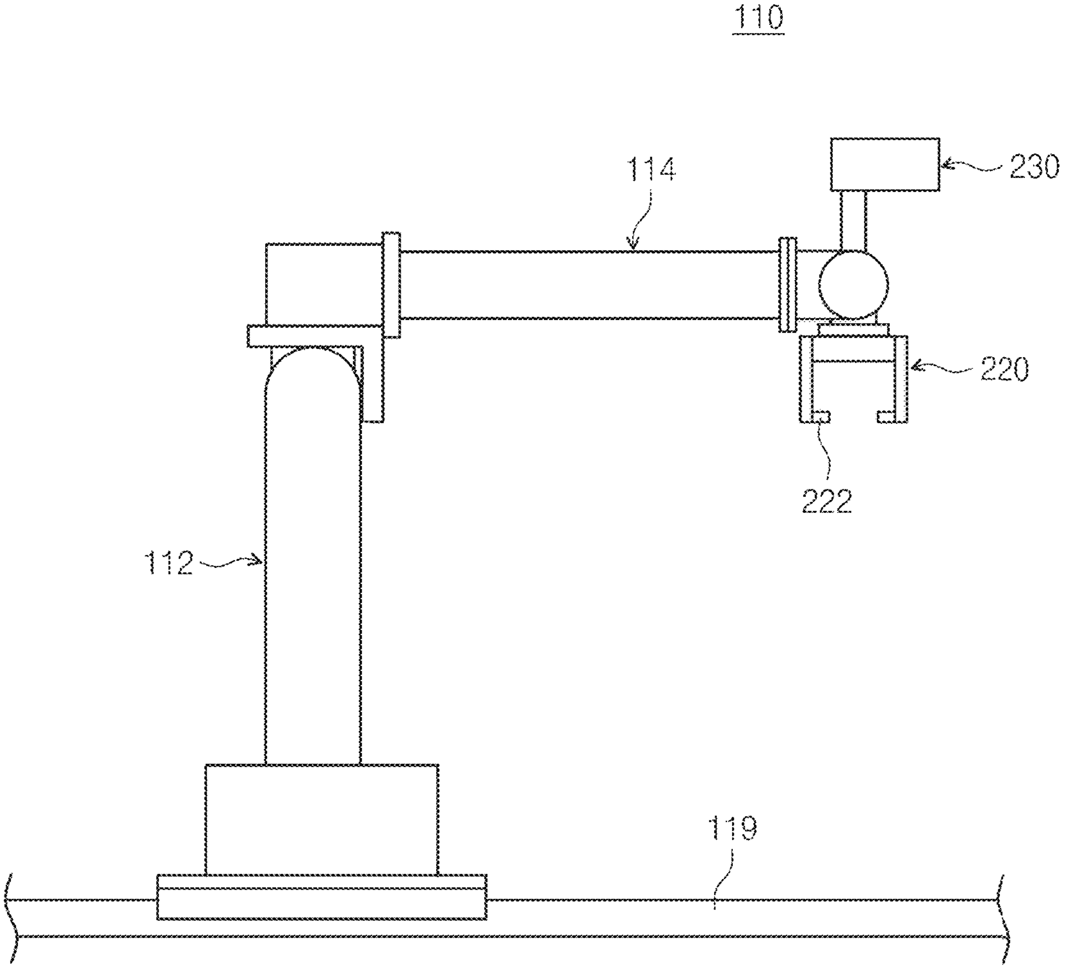
FIG. 3 is a diagram illustrating an articulated robot illustrated in FIG. 1.
Figure 4:
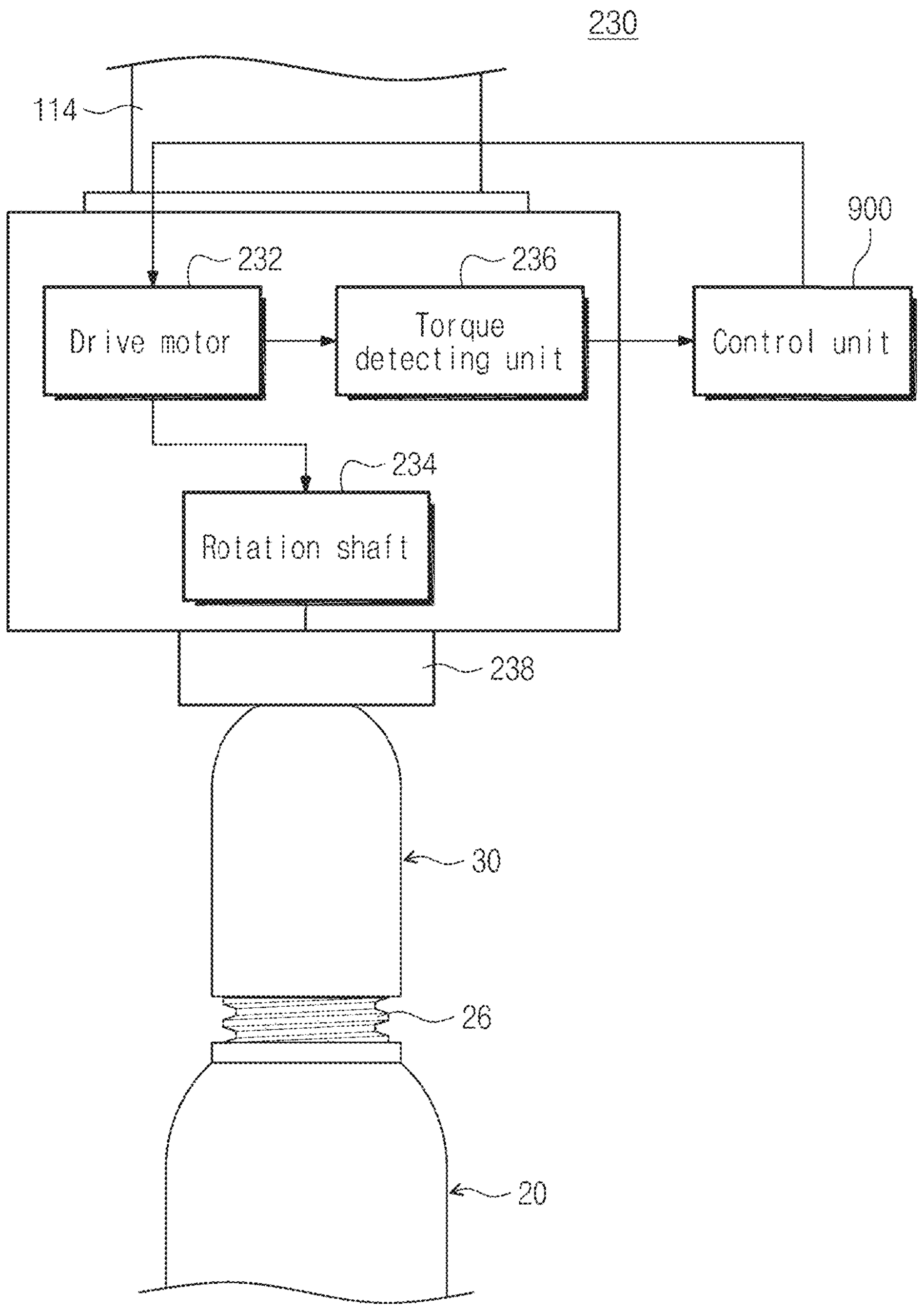
FIG. 4 is a drawing illustrating a nut runner illustrated in FIG. 3.

FIG. 1 is a diagram illustrating a gas cylinder transportation and inspection system including a cap fastening apparatus according to an exemplary embodiment of the present invention. FIG. 2 is a diagram illustrating a gas cylinder illustrated in FIG. 1, FIG. 3 is a diagram illustrating an articulated robot illustrated in FIG. 1, and FIG. 4 is a drawing illustrating a nut runner illustrated in FIG. 3.

Referring to FIGS. 1 to 4, a gas cylinder transportation and inspection system 100 may include an articulated robot 110, an auto tool changer 120, a cylinder inspector 130, a cap storage rack 140, and a cylinder supply part 150.

The gas cylinder 20 may be transported to the cylinder supply part 150 while being stored in a cradle 50. The gas cylinder 20 which has been transported to the cylinder supply part 150 may be transferred to the cylinder inspector 130 by the articulated robot 110. The articulated robot 110 transfers the gas cylinder 20 from the cylinder supply part 150 to the cylinder inspector 130 by using a cylinder gripper 210. The auto tool changer 120 may provide replacement tools 210 and 220 that are mountable on the articulated robot 110. The replacement tools 210 and 220 may include the cylinder gripper 210 required for the articulated robot 110 to transfer the gas cylinder 20, and a cap fastening/disconnecting gripper 220 required for transferring a protective cap 30 and fastening/disconnecting the protective cap 30. The articulated robot 110 performs the transferring operation of the gas cylinder 20 in the state where the cylinder gripper 210 is mounted on the robot arm 112 at the auto tool changer 120, and when the transferring of the gas cylinder 20 is completed, the articulated robot 110 may replace the cylinder gripper 210 mounted on the robot arm 112 at the auto tool changer 120 with the cap fastening/disconnecting gripper 220 and then perform the fastening and disconnecting operations of the protective cap 30. In one example, the replacement tools 210 and 220 may be attached to an end of the robot arm 112 of the articulated robot in a publicly known quick joint method.

The cylinder inspector tester 130 may inspect the composition of the gas and whether there is a gas leak in the gas cylinder 20. In addition, the cylinder tester 130 may inspect the condition of the gas cylinder by using measuring devices, such as a vision sensor and an LDS sensor. For example, the cylinder inspector 130 may perform operations of measuring a diameter of the gas cylinder 20, measuring a tilt of the neck ring 26, aligning the gas cylinder 20, and the like.

The articulated robot 110 disconnects the protective cap 30 from the gas cylinder 20 while being equipped with the cap fastening/disconnecting gripper 220, and stores the disconnected protective cap 30 in the cap storage rack 140. In the cylinder inspector 130, the gas cylinder 20 is subjected to various aforementioned inspections with the protective cap 30 removed.

The gas cylinder 30 that has been inspected by the cylinder inspector 130 may be transferred to a gas cabinet (gas supply device) 700 by a cylinder transfer device 800. On the other hand, the gas cylinder that has run out of gas in the gas cabinet 700 may be transferred to the cylinder inspector 130 by the cylinder transfer device 800. The articulated robot 110 fastens the protective cap 30 to the gas cylinder 20 that has run out of gas in the state of being mounted with the cap fastening/disconnecting gripper 220.

Referring to FIG. 2, the gas cylinder 20 has an overall cylindrical shape and is filled with gas at high pressure inside. The gas cylinder 20 may include a valve 21 formed in a longitudinal direction, a gas outlet port 22 formed in a direction orthogonal to the valve 21, and an end cap 23 that may be fastened to and disconnected from the end of the gas outlet port 22, at one end thereof. The end of the gas cylinder 20 in which the valve 21, the gas outlet port 22, and the end cap 23 are formed is defined as a head of the gas cylinder 20. The head may be protected by the protective cap 30. The protective cap 30 may be fastened to the neck ring 26 of the gas cylinder 20 by a screw method.

The articulated robot 110 may be moved in a first direction along a guide rail 118. The articulated robot 110 may include a robot main body 112 and a robot arm 114 in an articulated structure. An end of the robot arm 114 may be equipped with the cap fastening/disconnecting gripper 220 required for fastening/disconnecting the protective cap 30. The cap fastening/disconnecting gripper 220 may include a gripper 222 and a nut runner 230. The gripper 222 may have a pincer-like structure. However, the present invention is not limited thereto and may have other structures capable of fixing the protective cap 30. According to the present exemplary embodiment, the nut runner 230 may be mounted on the end of the robot arm 114. The nut runner 230 may help the protective cap to be fastened to the neck ring 26 by rotating the protective cap 30 in a forward direction or help the protective cap 30 to be disconnected from the neck ring 26 by rotating the protective cap 30 in a reverse direction.

The nut runner 230 may include a drive motor 232, a rotation shaft 234, and a torque detecting unit 236. The rotation shaft 234 is rotated by the drive motor 232, and a cap socket 238 connected to the rotation shaft 234 is connected to the protective cap 30. The torque detecting unit 236 detects the torque generated on an output shaft of the drive motor 232. The torque detected by the torque detecting unit 236 may be provided to the controller 900.

A control unit 900 may detect a screw thread engagement point of the protective cap 30 and the neck ring 26 and control the nut runner 230 to ideally fasten the protective cap 30 to the neck ring 26.

The control unit 900 may specify the point P (see FIG. 6) where the waveform of the torque detected by the torque detecting unit 236 of the nut runner 230 is rapidly resolved by rotating the protective cap 30 in the reverse direction as the engagement point. The control unit 900 may stop the reverse rotation (loosening action) of the nut runner 230 at the point P where the waveform of the torque is rapidly resolved. Further, the control unit 900 may rotate the protective cap 30 in the reverse direction at least two times (720 degrees) to determine the periodicity of the points P where the waveform of the torque is rapidly resolved and determine the engagement point. The control unit 900 may control the nut runner 230 to set the engagement point with a fastening start position for fastening the protective cap 30 and fastening the protective cap 30 to the neck ring 26.

The cap fastening apparatus including the above-described configuration is not limited to fastening the protective cap of the gas cylinder, and is applicable to fastening caps of various containers by a screw method.

Figure 5:
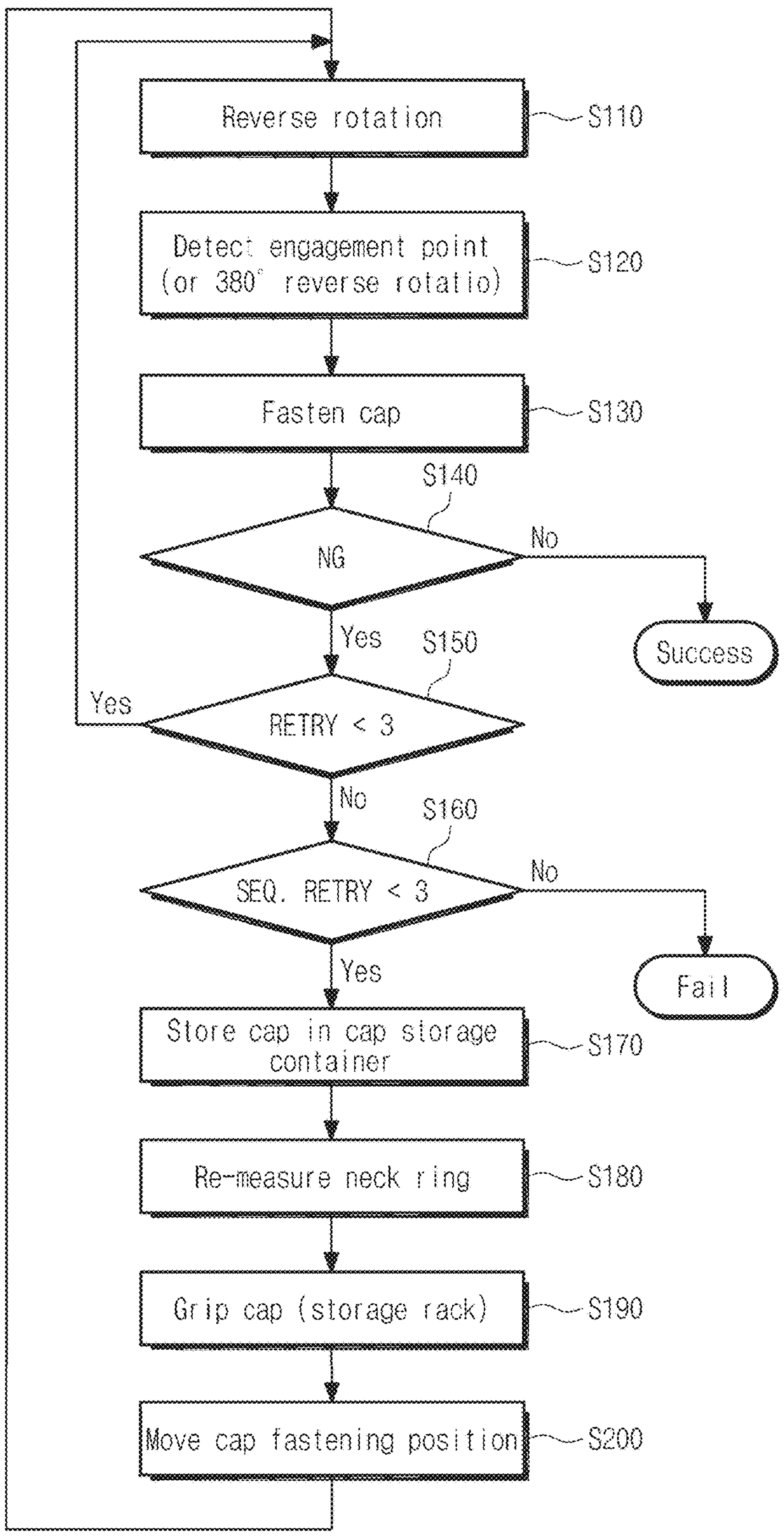
FIG. 5 is a flowchart illustrating a method of fastening a protective cap of a gas cylinder.
Figure 6:
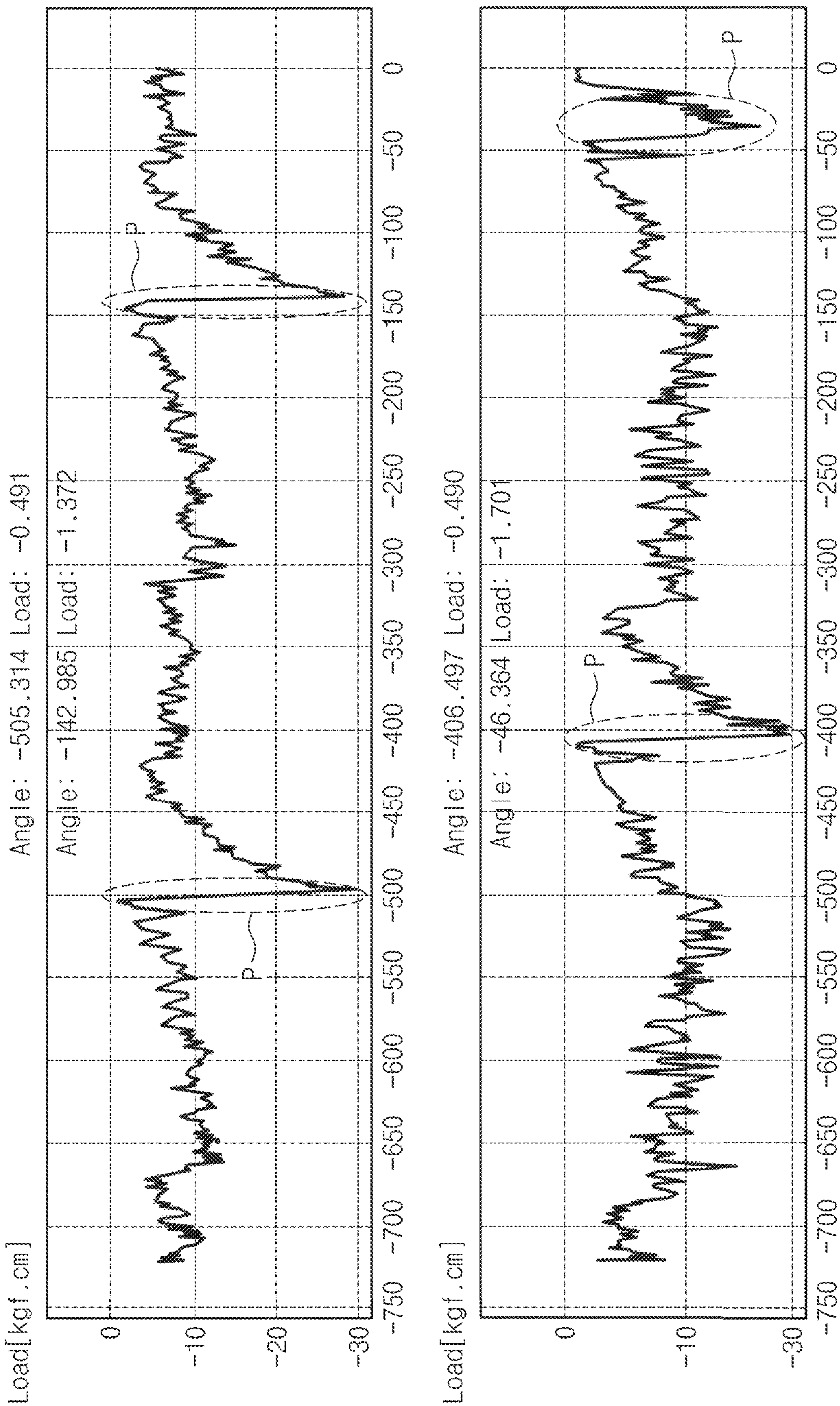
FIG. 6 is a graph illustrating a waveform of a fastening torque during the reverse rotation of the protective cap.

FIG. 5 is a flowchart illustrating a method of fastening a protective cap of a gas cylinder, and FIG. 6 is a graph illustrating a waveform of a fastening torque during the reverse rotation of the protective cap.

Referring to FIGS. 4 to 6, a method of fastening a protective cap of a gas cylinder includes rotating the protective cap 30 in a reverse direction in a state where the protective cap 30 is seated on the neck ring 26 of the gas cylinder 20 (S110). In this case, the reverse rotation of the protective cap 30 may be more than 360 degrees. Preferably, the reverse rotation of the protective cap 30 may be 380 degrees. However, the rotation angle is not limited thereto. The reverse rotation of the protective cap 30 by 380 degrees is intended to provide a different starting point for the reverse rotation when the reverse rotation of the protective cap 30 is subsequently retried in the event of a fastening error. The control unit 900 stops the reverse rotation immediately when a point is detected where a fastening torque is rapidly resolved when the protective cap 30 is rotated in the reverse direction (S120). The control unit 900 then controls the nut runner 230 so that the protective cap 30 is fastened to the neck ring 26. The nut runner 230 fastens the protective cap 30 to the neck ring 26 via a forward rotating operation (tightening operation) (S130).

Figure 7:
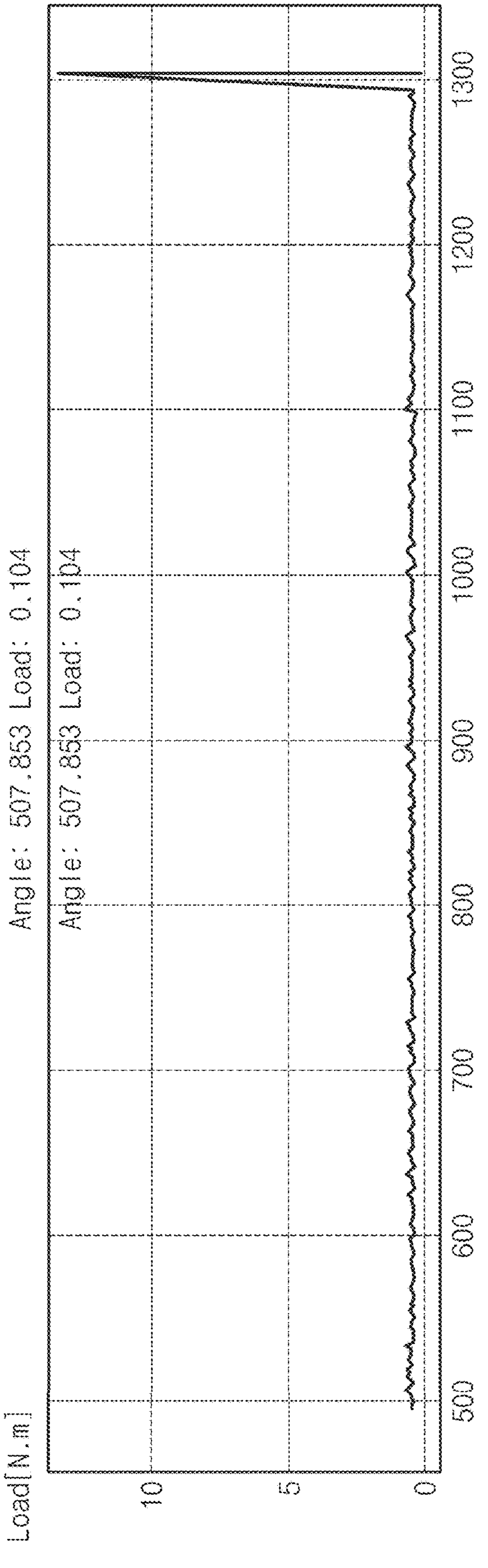
FIG. 7 is a graph showing the waveform of the torque during the fastening of the protective cap.

FIG. 7 is a graph showing the waveform of the torque during the fastening of the protective cap. As illustrated in FIG. 7, in the tightening operation to fasten the protective cap 30 to the neck ring 26, a sudden increase in torque is judged to be a final fastening point and the fastening of the protective cap 30 is judged to be successful.

Figure 8:
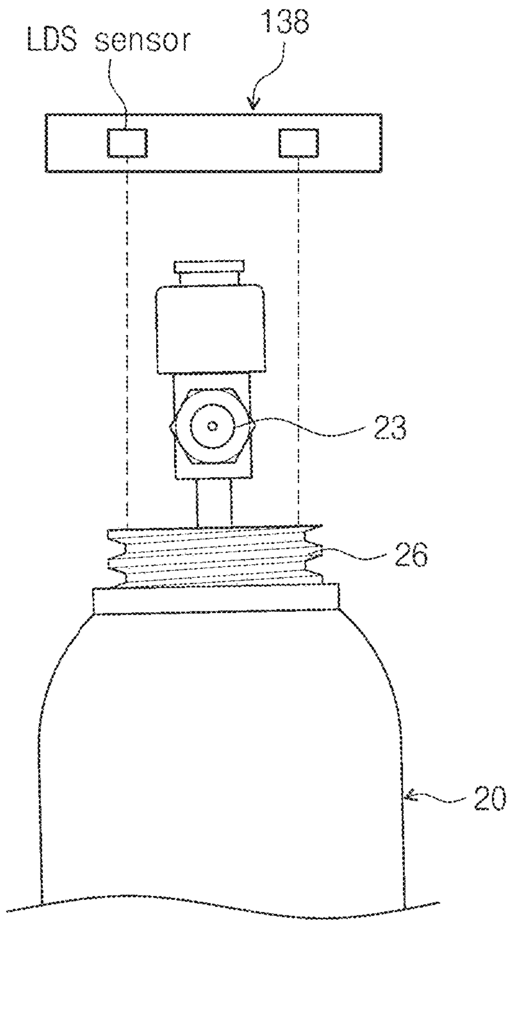
FIG. 8 is a diagram illustrating a tilt inspection of the neck ring.

When the fastening error of the protective cap 30 occurs, the preceding process is repeatedly performed (S150). As a method of determining the fastening error, the case where a sudden torque increase (determined as the final fastening point) does not occur even though the protective cap 30 is fastening to the neck ring 26 for the predetermined number of rotations, or the case where a sudden torque increase occurs before the protective cap 30 is rotated for the predetermined number of rotations may be determined as the fastening error. In the retry process after the fastening error, the starting point of the reverse rotation of the protective cap 30 may be different from the starting point of the previous reverse rotation. When the retry process exceeds three times, the process of re-measuring a tilt of the neck ring 26 is performed. To re-measure the tilt of the neck ring 26, the protective cap 30 is first disconnected from the gas cylinder 20 and stored in the cap storage rack 140. In the state where the protective cap 30 is disconnected, the tilt of the neck ring 26 is re-measured by using a tilt meter 138 (see FIG. 8). As illustrated in FIG. 8, the measurement of the tilt of the neck ring 26 may calculate distance values at four or more edges of the neck ring 26 by using the LDS sensors, and calculate the tilt of the neck ring 26 by using the calculated distance values. The control unit 900 may reset a fastening angle of the nut runner 230 through the calculated tilt value of the neck ring 26. When the measurement of the tilt of the neck ring 26 is completed, the protective cap 30 stored in the cap storage rack 140 is seated back on the neck ring 26 and then the operations from the reverse rotation operation S110 are retried. When the tilt of the neck ring is re-measured more than three times, it is considered a final failure and an operator is notified.

In the foregoing exemplary embodiments, the method is described on the basis of a flow chart as a series of operations or blocks, but the present invention is not limited to the order of operations, and the operations of the present invention may occur in a different order or concurrently with other operations as described above. Further, those skilled in the art will understand that the operations illustrated in the flow chart are not exclusive, and that other operations may be included or one or more operations of the flow chart may be deleted without affecting the scope of the present invention.

The foregoing exemplary embodiments are presented for helping the understanding of the present invention, and do not limit the scope of the present invention, and it should be understood that various modified exemplary embodiments from the foregoing exemplary embodiments are also included in the scope of the present invention. The technical protection scope of the present invention should be determined by the technical spirit of the claims, and it should be understood that the technical protection scope of the present invention is not limited to the literal description of the claims itself, but is substantially equivalent to the technical value.

What is claimed is:

1. An apparatus for automatically fastening a cap of a container, the apparatus comprising:
- a container gripper configured to hold the container;
- an articulated robot configured to grip the cap and to seat the cap on a neck ring of the container;
- a cap gripper configured to hold the cap seated on the neck ring;
- a nut runner configured to fasten the cap to the neck ring;
- a tilt inspector configured to inspect a tilt of the neck ring; and
- a control unit configured to,
  - detect a screw thread engagement point of the cap and the neck ring to control the nut runner to fasten the cap to the neck ring,
  - when cap fastening fails, retry detecting the screw thread engagement point, and
  - in response to a number of retries exceeding a given number, control the articulated robot to remove the cap from the neck ring, cause the tilt inspector to re-measure the tilt of the neck ring to obtain a re-measured tilt, control the articulated robot to seat the cap on the neck ring according to the re-measured tilt, and control the nut runner to fasten the cap to the neck ring.

2. The apparatus of claim 1, wherein the control unit is configured to determine, as the screw thread engagement point, a point at which a waveform of a torque detected by a torque detecting unit of the nut runner is rapidly resolved by rotating the cap in a reverse direction.

3. The apparatus of claim 2, wherein the control unit is configured to stop rotating the cap in the reverse direction at the screw thread engagement point at which the waveform of the torque is rapidly resolved.

4. The apparatus of claim 2, wherein the control unit is configured to determine the screw thread engagement point by determining a periodicity of at least two screw thread engagement points at which the waveform of the torque is rapidly resolved by rotating the cap at least two times in the reverse direction.

5. The apparatus of claim 2, wherein the control unit is configured to control the nut runner to align the screw thread engagement point with a fastening start position of the cap and fasten the cap to the neck ring.

6. The apparatus of claim 2, wherein the container includes a gas cylinder.

7. The apparatus of claim 2, prior to the screw thread engagement point, the torque has a first value and at the screw thread engagement point the torque has a second value less than the first value.

8. The apparatus of claim 1, wherein the control unit is further configured to fasten the cap to the neck ring by rotating the cap in a forward direction after determining the screw thread engagement point, and wherein rotating the cap in the forward direction is a second operation in fastening the cap.

9. The apparatus of claim 1, wherein the control unit is configured to determine a successful operation of fastening of the cap to the neck ring when a torque detected by a torque detecting unit of the nut runner rapidly increases.

10. The apparatus of claim 1, wherein the control unit is configured to determine a failed operation of fastening the cap to the neck ring when a rapid increase in a torque detected by a torque detecting unit of the nut runner does not occur after a set number of rotations of the cap or when the rapid increase in the torque occurs before the set number of rotations of the cap.

11. The apparatus of claim 1, wherein the control unit is configured to rotate the cap at least one full revolution in a reverse direction.

12. The apparatus of claim 1, wherein the control unit is configured to rotate the cap in a reverse direction as a first operation in fastening the cap to the neck ring after the cap is seated on the neck ring, and wherein, based on rotating the cap in the reverse direction, the control unit is further configured to determine the screw thread engagement point of the cap and the neck ring to control the nut runner to fasten the cap to the neck ring.

* * * * *